United States Patent [19]

Epstein et al.

[11] Patent Number: 5,109,070

[45] Date of Patent: Apr. 28, 1992

[54] COMPOSITIONS OF INSULATING POLYMERS AND SULFONATED POLYANILINE COMPOSITIONS AND USES THEREOF

[75] Inventors: Arthur J. Epstein, Bexley; Jiang Yue, Columbus, both of Ohio

[73] Assignee: Ohio State University Research Foundation, Columbus, Ohio

[21] Appl. No.: 528,959

[22] Filed: May 25, 1990

Related U.S. Application Data

[63] Continuation-in-part of Ser. No. 423,902, Oct. 19, 1989, which is a continuation-in-part of Ser. No. 193,964, May 13, 1989, Pat. No. 5,079,334.

[51] Int. Cl.$^5$ ............................................. C08L 81/00
[52] U.S. Cl. ........................... 525/189; 525/420; 525/422; 525/523
[58] Field of Search ................. 525/422, 189, 420, 523

[56] References Cited

U.S. PATENT DOCUMENTS

| | | | |
|---|---|---|---|
| 3,941,810 | 3/1976 | Koebner | 260/329 |
| 4,488,943 | 12/1984 | Skotheim | 204/58.5 |
| 4,556,623 | 12/1985 | Tamura et al. | 430/83 |
| 4,585,581 | 4/1986 | Skotheim | 252/518 |
| 4,586,792 | 5/1986 | Yang et al. | 350/357 |
| 4,604,427 | 8/1986 | Roberts et al. | 525/417 |
| 4,615,829 | 10/1986 | Tamura et al. | 252/500 |
| 4,636,430 | 1/1987 | Moehwald | 428/304.4 |
| 4,742,867 | 5/1988 | Walsh | 115/96 |
| 4,749,260 | 6/1988 | Yang et al. | 350/357 |
| 4,822,638 | 4/1989 | Yaniger | 427/79 |
| 4,851,487 | 7/1989 | Yaniger et al. | 525/540 |
| 4,855,361 | 8/1989 | Yaniger et al. | 525/436 |
| 4,935,164 | 6/1990 | Wessling et al. | 525/191 |
| 4,973,391 | 11/1990 | Madou et al. | 204/78 |

FOREIGN PATENT DOCUMENTS

61-197633 of 0000 Japan .

OTHER PUBLICATIONS

Paul, et al., J. Phys. Chem. 89: 1441-1447 (1985).
Stafstrom et al., Phys. Rev. Lett. 59: 1464 (1987).
Rice et al., Phys. Rev. Lett., 49: 1455 (1982).
Bredas et al., Phys. Rev., B29: 6761 (1984).
Chiang et al., Synth. Met. 13: 193 (1986).
Ginder et al., Solid State Commun., 63: 97 (1987).
Epstein et al., Synth. Met., 18: 303 (1987).
Choi et al., Phys. Rev. Met., 59: 2188 (1987).
Skotheim et al., Electrochem. Soc., 132: 246 (1985).
Obayashi et al., Adv. Chem. Ser., 163;316 (1977).
Sammels et al., J. Electrochem. Soc., 131: 617 (1984).
Chao et al., J. Am. Chem. Soc., 109: 6627 (1987).
Hardy et al., J. Am. Chem. Soc., 1071: 3823 (1985).
Gregory et al., Synthetic Metals, 28: C823-C835 (1989).
Nakajima et al., Synthetic Metals, 28: C629-C638 (1989).
Mizumoto et al., Synthetic Metals, 28: C639-C646 (1989).
Angelopoulos et al., J. Vac. Sci. Technol. B7 (6) Nov./Dec. 1989.
Lacroix et al., J. Electrochem. Soc., 136: 1308-1313 (1989).
Chem. Abstracts, 106: 33982g (1987).

*Primary Examiner*—Paul R. Michl
*Assistant Examiner*—Yong S. Lee
*Attorney, Agent, or Firm*—Emch, Schaffer, Schaub & Porcello

[57] ABSTRACT

Multicomponent polymeric compositions comprising self-prontonated sulfonic acid-substituted polyaniline compositions or derivatives thereof and at least one insulating polymer are disclosed. The sulfonated polyaniline compositions have faster electronic and optical responses to electrochemical potentials, improved environmental stability, and improved solubility than the parent polymer, polyaniline. The multicomponent sulfonated polyaniline/insulating polymer compositions are useful in electronic, chemical, electrochemical, and optical microelectric applications which use and control the chemical and physical properties of the sulfonated polyaniline compositions.

14 Claims, No Drawings

COMPOSITIONS OF INSULATING POLYMERS AND SULFONATED POLYANILINE COMPOSITIONS AND USES THEREOF

BACKGROUND OF THE INVENTION

The present invention is a continuation-in-part of co-pending application Ser. No. 07/423,902 filed Oct. 19, 1989 which is a continuation-in-part of co-pending application Ser. No. 193,964 filed May 13, 1988, now U.S. Pat. No. 5,079,334.

The present invention relates to self-protonated sulfonic acid-substituted polyaniline compositions, their derivatives, and uses thereof.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possessing the general formula

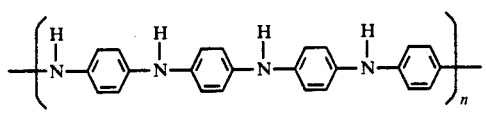

the partially oxidized so-called emeraldine base form, of the general formula

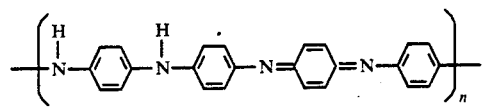

and the fully oxidized so-called pernigraniline form, of the general formula

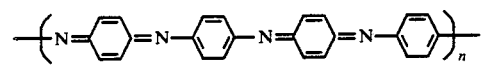

In practice, polyaniline generally exists as a mixture of the several forms with a general formula (I) of

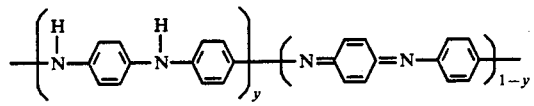

When $0 \leq y \leq 1$, the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of $y=1$. The fully oxidized poly(paraphenyleneimine) is referred to as pernigraniline, of repeat unit shown above corresponds to a value of $y=0$. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

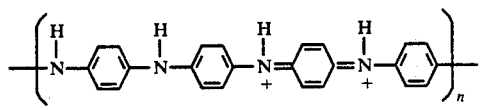

which may be rewritten as

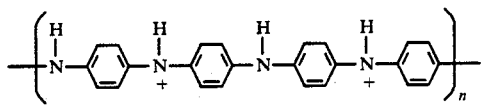

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyanline can be switched between conducting, protonated and nonconducting states at a rate of approximately $10^5$ Hz for electrolytes in solution and even faster with solid electrolytes. (E. Paul, et al., *J. Phys. Chem.* 1985, 89, 1441–1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, in contrast to, for example, the polypyrrole mentioned above, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt $[(-C_6H_4-NH-C_6H_4-NH^+)-Cl^-]_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

The present invention is a continuation-in-part of and related to the invention disclosed in the co-pending application Ser. No. 07/423,902 filed Oct. 19, 1989 which is expressly incorporated herein by reference. The application discloses sulfonated polyaniline compositions and their derivatives, processes for their preparation and uses thereof.

While the preparation of polyaniline polymers and the protonated derivatives thereof is known in the art, it is novel to prepare sulfonated polyaniline compositions which are capable of being "self-protonated" or "self-doped". The use of the terms "self-protonated" and "self-doped" herein includes, but is not limited to, the reorganization of hydrogen ions on the polymer i.e., the absence of any counterion not covalently bonded to the polymer chain. For example, self-doping or self-protonation of a polyaniline base polymer leads to a polyaniline salt polymer and a reorganization of the electronic structure which then forms a polaronic metal. The conductivity of such polaronic metal is independent of external protonation.

It is also novel to blend self-doped, sulfonated polyaniline with other, insulating, polymers to form a multicomponent polymeric system.

SUMMARY OF THE INVENTION

The present invention relates to a polymeric acid polymer which is capable of protonating or doping itself to form an electrically conducting polymer. The sulfonated polyaniline polymer has faster electronic, electrochemical, chemical, and optical responses and improved solubility than the parent polymer, polyaniline. The solubility of the sulfonated polyaniline polymer is increased greatly due to the presence of the sulfonic group $SO_3H$. The sulfonated polyaniline polymer is easy to dissolve in basic aqueous solutions in which the polyaniline polymer is insoluble. In addition, due to the electron withdrawing effects of the $SO_3H$ group, the sulfonated polyaniline polymer has improved environmental stability over the polyaniline polymer. The process for producing the sulfonated polyaniline comprises reacting the polyaniline polymer with concentrated sulfuric acid.

The present invention also relates to the use of sulfonated polyaniline compositions and their derivatives in electronic, electrochemical, chemical, and optical applications.

The present invention also relates to the use of sulfonated polyaniline as an electrical conductor, either in its pure form or blended with other polymers such as Kevlar® a polyamide material commercially available from the E.I. DuPont DeNemours & Co., Kevlar Special Products, Wilmington, Del. or nylon, a polyamide material, to provide a medium for electrostatic discharge in device housings and also bulk coverings such as carpets and fabrics.

BRIEF DESCRIPTION OF THE DRAWINGS

FIG. 1 is a schematic illustration of the different structures of sulfonated polyaniline, (a and b), the ammonia salt (c), and the emeraldine base (d).

DETAILED DESCRIPTION OF THE INVENTION

The present invention relates to multicomponent polymeric systems comprising sulfonic acid substituted polyaniline compositions and their derivatives thereof and at least one insulating polymer.

The self-protonated sulfonated polyaniline compositions have the formula I

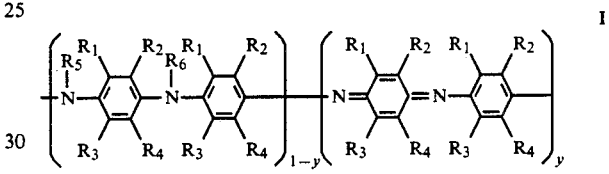

wherein $0 \leq y \leq 1$; $R_1$, $R_2$, $R_3$, $R_4$, $R_5$ and $R_6$ are independently selected from the group consisting of H, $-SO_3^-$, $-SO_3H$, $-R_7SO_3^-$, $-R_7SO_3H$, $-OCH_3$, $-CH_3$, $-C_2H_5$, $-F$, $-Cl$, $-Br$, $-I$, $-NR_7{}_2$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1$-$C_8$ alkyl, aryl or aralkyl group. For the sake of clarity, the structure shown in formula I is in the non self-protonated form.

The fraction of rings containing at least one $R_1$, $R_2$, $R_3$ or $R_4$ groups being an $-SO_3^-$, $-SO_3H$, $-R_7SO_3^-$ or $-R_7SO_3H$ can be varied from a few percent to one hundred percent. In certain embodiments the percentage ranges from at least approximately 20% up to and including 100%. It is within the contemplated scope of the present invention that the $-R_7SO_3^-$ and $-R_7SO_3H$ substituents can be varied so that the sulfonated polyaniline is soluble in a range of solvents in order to make the sulfonated polyaniline polymer more easily blendable with other polymers and/or more easily cast onto a variety of surfaces.

The solubility of sulfonated polyaniline can be varied by changing the degree of sulfonation (i.e., the sulfonation time and/or temperature in $H_2SO_4(SO_3)$). It is noted that the oxidation state of the polymer (from leucoemeraldine through emeraldine to pernigraniline) and the degree of sulfonation (x) can be independently varied. Here x is the fraction of $C_6$ rings which have an $SO_3^-$ or $SO_3H$ group attached.

When x=0, the polymer does not dissolve in either basic or acidic aqueous solutions. Upon increasing the value of x, the polymer becomes soluble in strongly basic, basic, weakly basic and eventually in acidic aqueous solutions. This progressive improvement in solubility implies that the polymer becomes soluble in neutral media, particularly $H_2O$, at the appropriate value of x, yielding a water-soluble conducting polymer. The color of soluble sulfonated polyaniline in acidic solution is green, indicating it is the conducting salt form.

The solubility of polyaniline is increased greatly in basic aqueous solution by the presence of $-SO_3H$ group on the phenyl rings. This is in contrast with polyaniline which when washed with basic solutions, converts to the insoluble base form.

Protonation of the emeraldine base polymer leads to the emeraldine salt polymer and a reorganization of the electronic structure to form a polaronic metal. Since benzenesulfonic acid is a strong acid, about as strong as hydrochloric acid, the sulfonated polyaniline is capable of self-doping. Hence, the conductivity of the sulfonated polyaniline is independent of external protonation.

Being able to dope itself, the sulfonated polyaniline polymer has enhanced optical and electrical response to electrochemical potential as compared with the parent polyaniline polymer. Since the solid-state diffusion of counterions in and out of a polymer during electrochemical processes is often the rate controlling step in the kinetics, it also limits the speed of both optical and electrical response of polymers. In the self-doped conjugated polymer of the present invention, the counterions are not necessary from the medium. The positive charge introduced into the conjugated pi electron system of the backbone of the polymer is compensated by the protons migrating out of the polymer, or vice versa, leaving behind the opposite charged counterion. Being the smallest and most mobile ion, proton hopping mechanisms lead to relatively fast doping kinetics as compared to those counterions migrating in or out of the polymer. As a consequence, it is possible to achieve sufficient speed to be useful for a variety of technological applications.

The sulfonated polyaniline polymers of the present invention provide opportunities to use the phenomena of the dependence of electrical and optical properties on the backbone chain conformation and on the substituent as well as chain properties which change the chemical properties of polyaniline in a number of useful applications. The side groups on polyaniline also can affect the charge transport in polyaniline.

Without external doping, the sulfonated polyaniline composition has a conductivity of 0.1 S/cm, which makes the sulfonated polyaniline a self-doped conducting polymer. The amount of charge injected into or ejected out of the sulfonated polyaniline polymer is quite similar to that of polyaniline. Charge transfer doping within a specific potential range in solutions such as 1.0M HCl and 0.5M $H_2SO_4$ is highly reversible in the air reflecting the environmental stability introduced by the sulfonic acid groups.

The chemical synthesis of the sulfonated polyaniline polymers of the present invention is accomplished by reacting polyaniline with concentrated or fuming sulfuric acid, gaseous $SO_3$ or other sulfonation agents. Examples of several of the various methods for such synthesis are disclosed below.

Materials—Aniline and other chemicals were obtained from Aldrich and were all reagent grade or better. Hydrochloric acid and ammonium hydroxide were used as received. Different pH buffer solutions were commercially purchased.

Chemical Synthesis I: Emeraldine hydrochloride powder was synthesized from aniline and $(NH_4)_2S_2O_8$ then converted to analytically pure emeraldine base polyaniline using the method described previously in A. G. MacDiarmid, J. C. Chiang, A. F. Richter, N. L. D. Somasiri and A. J. Epstein in L. Alcacer (ed.) *Conducting Polymers*, D. Reidel Publishing Co., Dordrecht, The Netherlands (1987).

For the sulfonation of polyaniline, 1.5 g polyaniline (dry emeraldine base form) was dissolved into 40 ml fuming sulfuric acid $H_2SO_4(SO_3)$ with constant stirring at room temperature. During the sulfonation period the color of the solution changed from dark purple to dark blue. After approximately 2 hours, the solution was slowly added during about 20 minutes to 200 ml methanol while maintaining the temperature between about 10°-20° C. by an ice bath. A green powder precipitate was formed during the mixing. After the mixing, 100 ml of less polar acetone was added to the solution in order to increase the precipitate. The green powder was then collected on a Buchner funnel using a water aspirator. The precipitate cake was washed portionwise (50 ml/portion) with methanol until the portion of the filtrate showed pH=7 when tested by wet pH paper. The liquid level in the Buchner funnel was constantly adjusted so that it remained above the top of the precipitate. This prevented cracking of the precipitate cake, which would result in inefficient washing of the precipitate cake.

After the above washing, the precipitate remained under suction for approximately 10 minutes. It was then transferred on the filter paper to a vacuum desicator and dried under dynamic vacuum for 24 hours. Elemental analyses, as shown in Table I are consistent with the composition shown in FIG. 1 as structure a, compound I, which is sulfonated, protonated polyaniline in the emeraldine oxidative state. The self-doped polyaniline is readily dissolved in a dilute aqueous base solution to form a homogeneous blue-violet solution. The solubility of compound I in 0.1M $NH_4OH$ and NaOH is about 23 mg/ml.

Chemical Synthesis II: 1.5 g polyaniline (dry emeraldine base form) was dissolved into 40 ml concentrated sulfuric acid $H_2SO_4$, and the temperature slowly raised from the room temperature to 70° C. in water bath in 3 hour period with the constant stirring. The temperature was kept at 70° C. for 15 hours. Then the temperature was raised to 95° C. within 0.5 hour and kept there for 4 hours. The reaction mixture was cooled down to room temperature. The product was very slowly added to −38° C. ice made from 160 ml distilled $H_2O$ in order to precipitate the polymer. The temperature of the solution was not allowed to reach higher than 0° C. during the process. After the temperature of the solution reached room temperature the solution was filtered to obtain a fine powder of sulfonated polyaniline. Large particles were obtained by subsequently heating the room temperature solution up to 70° C. in a two hour period, then cooling to room temperature, and conducting filtration to separate the sulfonated polyaniline from the solution. The sulfonated polyaniline was washed with an excess of $H_2O$ until the filtrate was neutral (as tested by pH paper). Dry sulfonated polyaniline was obtained by pumping under dynamic vacuum at room temperature for 48 hours.

Chemical Synthesis III: From the Chemical Synthesis II described above a copolymer (i.e., the polymer mixture of polyanilines and sulfonated polyaniline) was obtained by partially sulfonating polyaniline. This was done in exactly the same way described in the Chemical Synthesis II except utilizing shorter sulfonation times and/or lower sulfonation temperature.

Chemical Synthesis IV: Another way to prepare the copolymer polyaniline-sulfonated polyaniline was to react 2-aminobenzene-sulfonic acid (2ASA) with oxidizing agent in the presence of aniline. 10 g (0.58 mol) 2ASA and 2 ml (0.02 mol) aniline were dissolved in 500 ml 1M HCl. A prepared solution of 6.609 g (0.029 mol) $(NH_4)_2S_2O_8$ in 200 ml 1M HCl was added dropwise to the monomer solution with vigorous stirring during a period of 10 minutes. After 1.5 hours, the precipitate was collected on a Buchner funnel. The precipitate was washed with 1M HCl until the filtrate was colorless. Then the precipitate was washed by 500 ml $H_2O$. To ensure that the copolymer was in its neutral form, the precipitate was then transferred into a beaker containing 500 ml of $H_2O$ and stirred at room temperature for 4 hours. The mixture was filtered until the pH of the filtrate was 7. The dry copolymer was obtained by pumping under dynamic vacuum at room temperature for 48 hours.

Chemical Synthesis V: Sulfonated polyaniline compositions can be made by exposing the polyaniline compositions to $SO_3$ gas, which method is fully disclosed in the co-pending application Ser. No. 07/529,012, filed May 25, 1990 concurrently herewith and entitled Processes for the Preparation of Sulfonated Polyaniline Compositions and Uses Thereof, which application is expressly incorporated herein by reference.

Conductivity measurement. Conductivities of the compound I was measured on compressed pellets of the powder by using four point probe techniques with a Keithley 220 constant current source and Keithley 181 voltmeter.

Conductivity studies are consistent with the sulfonation of emeraldine base with fuming sulfuric acid proceeding to give a self-doped, sulfonated, protonated forms of the emeraldine oxidative state of polyaniline, the compound I which has a conductivity of about 0.5 S/cm. This polymer can be regarded as being formed by the hypothetically initial formation of the strong acid, shown as structure b in FIG. 1, which then immediately protonates the imine nitrogen atoms to give the conducting polymer in an entirely analogous manner to strong acids such as HCl. Treatment of the structure b compound with an aqueous (ammonium) base yields the sulfonated, non-protonated insulating ammonium salt forms analogous to emeraldine base, viz, the structure c compound shown in FIG. 1.

The conductivity of the compound I ($\sigma \sim 0.1$ S/cm) is similar to that of emeraldine hydrochloride measured under the same experimental conditions ($\sigma \sim 1$-5S/cm; laboratory air), but lower than that $\sigma \sim 18$S/cm of high molecular weight emeraldine hydrochloride. The self-doped sulfonated polyaniline with emeraldine oxidative state differs dramatically from nonexternally doped polyaniline in conductivity. Since sulfonic acid is a strong acid, approximately as strong as hydrochloric acid, the compound I is capable of doping itself. Pressed pellets of the dark green self-doped compound I had a room temperature conductivity of about 0.1 S/cm in contrast to the purple color and insulating behavior of polyaniline emeraldine base form. However, the conductivity of compound I is lower than that of emeraldine hydrochloride pressed pellets; analogy with earlier study of poly(o-toluidine), the lower conductivity is in accord with increased conduction electron localization induced by the side chain effects of $-SO_3^-$.

The solubility of the compound I also differs markedly from that of the corresponding polyaniline polymer. The compound I dissolves completely in aqueous 0.1M $NH_4OH$ or NaOH to give a blue-violet solution while polyaniline washed with such solvent converts to the insoluble base form. The compound I partially dissolves in NMP to form a blue color solution and as well as DMSO (dimethyl sulfoxide) to show green color.

The deprotonation results in a 5 to 10 order of magnitude decrease in conductivity. Compound I differs from emeraldine hydrochloride in that it is soluble in aqueous 0.1M $NH_4OH$ and NaOH.

Elemental analyses and FTIR data suggest that, depending on the sulfonation times and temperatures, the number of $-SO_3H$ groups per phenyl ring varied from 0.2 to 1.0. The conductivity is independent of pH in the range of pH values smaller than or equal to 7.

In another aspect of the present invention, the dielectric loss of the sulfonated polyaniline polymeric compositions can be controlled by the design of the chemical composition of the sulfonated polyaniline polymer, the oxidative state of the polymer, and the degree of self-doping or self-protonation of the polymer. Thus, by the addition of electron-withdrawing or electron-donating groups to the nitrogen atoms and/or the $C_6$ rings of the leucoemeraldine, emeraldine, or pernigraniline sulfonated polyaniline compositions, the dielectric loss tangent can be varied. The dielectric loss tangents can be varied from $10^{-2}$ to approximately 20 by varying the form of the sulfonated polyaniline, the degree, site and type of substituents. In the prior art, carbon filled silicone rubber or carbon filled epoxy paints or carbon bonded to fabric produce nonmagnetic dielectric losses at microwave frequencies. One embodiment of the present invention for attaining maximum dielectric loss is the emeraldine salt, wherein y is in the range of from approximately 0.4 to 0.6 and the protonation is approximately one proton per imine nitrogen, i.e., $[H^+]/[-N=]$ is equal to approximately one.

The addition of electron-withdrawing or electron-donating groups to the sulfonated polyaniline composition can facilitate the design of a polymeric material with desired absorption and transmission bands. The electronwithdrawing or electron-donating group can be present on the $C_6$ rings or the nitrogen atoms of the sulfonated polyaniline composition at any desired percentage of the available sites. Known electron-donating groups to be substituted onto the $C_6$ ring and operative in the present invention can include, but are not limited to, $-OCH_3$, $-CH_3$, $-C_2H_5$, halogens (electron-donating by way of a resonance effect), $-NR_2$, $-NHCOR$, $-OH$, $-O^-$, $-SR$, $-OR$, and $-OCOR$, wherein R is a $C_1$-$C_8$ alkyl, aryl or aralkyl. These groups or atoms possess one or more unshared electron pairs on the atom adjacent to the ring. Known electron-withdrawing groups can include halogens (electron-withdrawing by way of an inductive effect), $-NO_2$, $-COOH$, $-COOR$, $-COR$, $-CHO$, and $-CN$, wherein R is a $C_1$-$C_8$ alkyl, aryl or aralkyl. Thus, the addition of electron-donating groups to the rings of sulfonated polyaniline augments the charge delocalization. The added opportunities for resonance stabilization of the pi to pi* excited state provided by electron-donating groups causes a lowering in the requirement for excitation energy, and thus a decreased frequency (longer wavelength) of absorption. Conversely, the addition of electron-withdrawing groups diminishes the opportunities for resonance stabilization, causing an increase in the requirement for excitation energy, and thus an increased frequency (shorter wavelength) of absorption. Thus, for example, protonation of $-NH_2$ changes it to $-NH_3+$; this group no longer has an unshared pair of electrons to participate in charge delocalization. Alternation of $-OH$ to the ion, $-O^-$, provides further opportunity for participation of unshared electrons on oxygen in charge delocalization. Thus, the change of H to $NH_2$ is bathochromic; $NH_2$ to $NH_3+$ is hypschromic; OH to $O^-$ is bathochromic; and both of the changes, OH to $OCOCH_3$ and NH to $NHCOCH_3$ (acetylation), are hypsochromic.

The sulfonated polyaniline compositions and compositions comprising their derivatives can be used in a variety of electronic, electrochemical, chemical, and optical applications which applications are fully disclosed in the parent copending application, Ser. No. 07/423,902 filed Oct. 19, 1989 which is expressly incorporated herein by reference. The sulfonated polyaniline compositions have a more rapid electrochemical response than polyaniline. The ability of the sulfonated polyaniline compositions to have a fast switching speed between a conducting and a nonconducting state with good reversibility makes such compositions attractive polymers to use for a variety of electrochemical applications. The solubility and the electrical conductivity of the sulfonated polyaniline compositions makes such compositions especially useful in still other applications.

Sulfonated polyaniline can also be entrained within a matrix of, or copolymerized with, other polymer materials to thereby produce a multicomponent polymeric blend or composite. Thus, sulfonated polyaniline could be dispersed in, for example, such insulating polymers as polyethylene, polyimide, cellulose nitrate, and the like, and also can be coated onto fibrous materials. The sulfonated polyaniline/insulating multicomponent compositions can be used with other insulating polymers to form conductive thermosetting resins, epoxies, and thermoplastics, and reacted with bismaleimides for use in forming, for example, such devices as conductive seals, joints and moldings. Still other applications include the use of sulfonated polyaniline compositions as electrical conductors, either in pure form or blended with other polymers such as Kevlar ® polyamide material commercially available from the E.I. DuPont DeNemours & Co., Kevlar Special Products, Wilmington, Del. and nylon, a polyamide material, for use as a medium for electrostatic discharge in, for example device housings, and bulk coverings such as carpets and fabrics. In addition, derivatization of the sulfonated polyaniline compositions can enhance compatibility and processability of the sulfonated polyaniline polymer with other polymers.

The solubility of sulfonated polyaniline composition in different solvents provides the opportunity to make a wide variety of polymer blends or composites by mixing or copolymerizing the sulfonated polyaniline compositions with, for example, thermoplastics, elastomers and other polymers. It is thus possible to produce polymer blends or composites wherein the various polymeric components complement each other in order to achieve desired optimum properties. The desired properties of the sulfonated polyaniline blend or copolymer are the result of the components themselves, the interaction between the components, and phase structure as well as the processing conditions used in making the blend or composite. Further, orientation of the polymer blend or copolymer can enhance its properties. Thus, such optimum properties as conductivity and mechanical strength can be realized.

The conductivity of the sulfonated polyaniline/insulating multicomponent polymer composition can conveniently be controlled by varying the content of sulfonated polyaniline, the insulating matrix polymer(s) or a combination of them.

For example, a solution of poly (1,4-benzamide, $(-NH-C_6H_4CO-)-$, (PBA) was prepared by dissolving PBA into $H_2SO_4$ for a 12 hour period in order to ensure that the PBA was well dissolved. A predetermined amount, here 0.5 g was utilized, of sulfonated polyaniline was added to the PBA—$H_2SO_4$ solution. The resulting mixture was stirred vigorously until the polymers were uniformly dispersed. Solution cast films were made using a spinner. The resulting film had a conductivity of about 0.1 S/cm and the sulfonated polyaniline: PBA weight ratio was about 1:1. This conductivity is indicative of one possible conductivity. It is possible to achieve a variety of electrically conducting polymer blends which have conductivities ranging from less than about $10^{-10}$ S/cm to more than about 1 S/cm.

Further, it is possible to achieve considerable orientation of sulfonated polyaniline within the matrix polymer, such that there is both optical and electrical anisotrophy in the sulfonated polyaniline blends. Thus, by the use of controlled stretching conditions of various sulfonated polyaniline blends, it is possible to achieve blends having high electrical conductivities.

It is also within the contemplated scope of the present invention that the melting processing of two polymers in the melt phase can be used to obtain blends of sulfonated polyaniline with other polymers.

The sulfonated polyaniline/insulating polymeric compositions can be coated by a variety of techniques onto substrates of choice. The sulfonated polyaniline/insulating polymers can be applied to substrates according to the present invention by spray coating, dip coating, spin casting, transfer roll coating, brush-on coating, and the like. The sulfonated polyaniline/insulating polymers can also be electrochemically deposited onto conductive substrates by known electrochemical deposition techniques.

The multicomponent polymeric systems comprising at least one insulating polymer and sulfonated polyaniline compositions or derivatives thereof can be designed to have desired properties and processability in terms of, for example, viscosity, flexural strengths, solubility, adhesion to substrates, crosslinking, melting point, weight, adaptability to filler loading and the like. These properties are achieved by varying as desired the degree of self-protonation, the state of oxidation, and the type and degree of substituents on the sulfonated polyaniline polymer. Certain substituents may be preferred for the facilitation of desired processing parameters, such as increasing or decreasing solubility, altering extrusion parameters (rheology), achieving a specific viscosity, and the like.

Multicomponent polymeric systems comprising sulfonated polyaniline compositions or their derivatives and at least one insulating polymer can be used in a wide variety of applications, including those uses and applications which are expressly disclosed in the parent patent application Ser. No. 07/423,902.

While the invention has been disclosed in this patent application by reference to the details of preferred embodiments and examples of the invention, it is to be

TABLE 1

| sample | Elemental Analyses[a] of Chemically Synthesized Sulfonic Ring-Substituted Polyaniline | | | | | | |
|---|---|---|---|---|---|---|---|
| | C | H | N | S | O[b] | Total | Formula |
| PAN[c] (cal.) | 79.54 | 5.00 | 15.46 | — | — | 100 | $C_{12}H_9N$ |
| PAN (found) | 79.14 | 4.96 | 15.16 | — | — | 99.26 | |
| SPAN[c] (cal.) | 51.67 | 3.96 | 10.04 | 11.49 | 22.84 | 100.00 | $C_{12}H_9N_2SO_3(H_2O)_{0.98}$ |
| SPAN (found) | 52.12 | 3.98 | 10.13 | 11.18 | 22.59 | 100.00 | |

[a] C, H, and N analyses were performed by Dr. R. Kohli at U. of Pennsylvania, S analysis was carried out by M-H-W Laboratories, Phoenix, AZ.
[b] Oxygen content is by difference.
[c] PAN refers to polyaniline and SPAN to ring-sulfonated polyaniline.

We claim:

1. A multicomponent polymeric composition comprising a sulfonated polyaniline composition having a chemical composition of formula I

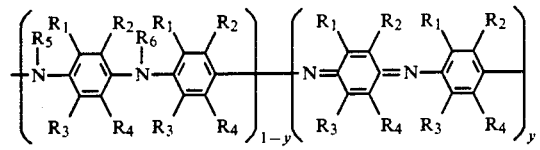

wherein $0 \leq y \leq 1$, $R_1$, $R_2$, $R_3$, $R_4$, $R_5$ and $R_6$ are independently selected from the group consisting of H, $-SO_3^-$, $-SO_3H$, $-R_7SO_3^-$, $-R_7SO_3H^-$, $-OCH_3$, $-CH_3$, $-C_2H_5$, $-F$, $-Cl$, $-Br$, $-I$, $-NR_{7\,2}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1-C_8$ alkyl, aryl or aralkyl group, and wherein the fraction of rings containing at least one $R_1$, $R_2$, $R_3$ or $R_4$ group being an $-SO_3^-$, $-SO_3H$, $-R_7SO_3^-$, or $-R_7SO_3H$ varies from approximately 20 percent to one hundred percent, wherein the sulfonated polyaniline composition is blended or entrained in a matrix with at least one insulating polymer.

2. The composition of claim 1, wherein the sulfonated polyaniline composition is of molecular weight in the range of from approximately 300 (oligomers of sulfonated polyaniline) to in excess of 100,000.

3. The composition of claim 1, wherein $R_1$ is selected from the group consisting of $-SO_3^-$, $-SO_3H$, $-R_7SO_3^-$, and $-R_7SO_3H$ and $R_2=R_3=R_4=H$ and $y \sim 0.5$.

4. The compositions of claim 1 having an electrical conductivity in the range of about $10^{-10}$ S/cm to about 1 S/cm.

5. The composition of claim 1 wherein the insulating polymer is poly (1,4-benzamide).

6. The composition of claim 1 wherein the insulating polymer is thermoplastic polymer.

7. The composition of claim 1 wherein the insulating polymer is an elastomeric polymer.

8. The composition of claim 1 wherein the insulating polymer is polyethylene.

9. The composition of claim 1 wherein the insulating polymer is polyimide.

10. The composition of claim 1 wherein the insulating polymer is cellulosenitrate.

11. The composition of claim 1 wherein the insulating polymer is a thermosetting resin.

12. The composition of claim 1 wherein the insulating polymer is an epoxy resin.

13. The composition of claim 1 wherein the insulating polymer is a bismaleimide.

14. The composition of claim 1 wherein the insulating polymer is a polyamide.

* * * * *